United States Patent [19]
Hida et al.

[11] 3,793,622
[45] Feb. 19, 1974

[54] NEGATIVE FEEDBACK CIRCUIT FOR USE IN CONSTANT SPEED VEHICLE TRAVEL CONTROL DEVICE

[75] Inventors: Takashi Hida; Naoji Sakakibara, both of Kariya, Japan

[73] Assignee: Aisin Seiki Kabushiki Kaisha, Kariya, Aichi Pref., Japan

[22] Filed: July 8, 1971

[21] Appl. No.: 160,638

[30] Foreign Application Priority Data
July 8, 1970 Japan................................ 45-59779

[52] U.S. Cl..................... 340/62, 123/108, 180/105
[51] Int. Cl........................ B60k 31/00, B60q 1/00
[58] Field of Search ..... 340/62; 180/105; 307/10 R; 324/167, 161; 123/108

[56] References Cited
UNITED STATES PATENTS
| | | | |
|---|---|---|---|
| 3,455,411 | 7/1969 | Carp et al............................ | 180/105 |
| 3,496,535 | 2/1970 | Tyzack................................ | 340/62 |
| 3,166,278 | 1/1965 | Steinbach et al..................... | 340/62 |

Primary Examiner—John W. Caldwell
Assistant Examiner—Glen R. Swann, III
Attorney, Agent, or Firm—Sughrue, Rothwell, Mion, Zinn & Macpeak

[57] ABSTRACT

A device for controlling the speed of a vehicle in which the actual vehicle speed is compared to a reference speed and the speed is controlled until the actual speed is equal to the reference speed. The device includes a feedback circuit for adjusting the reference speed in order to eliminate hunting.

6 Claims, 2 Drawing Figures

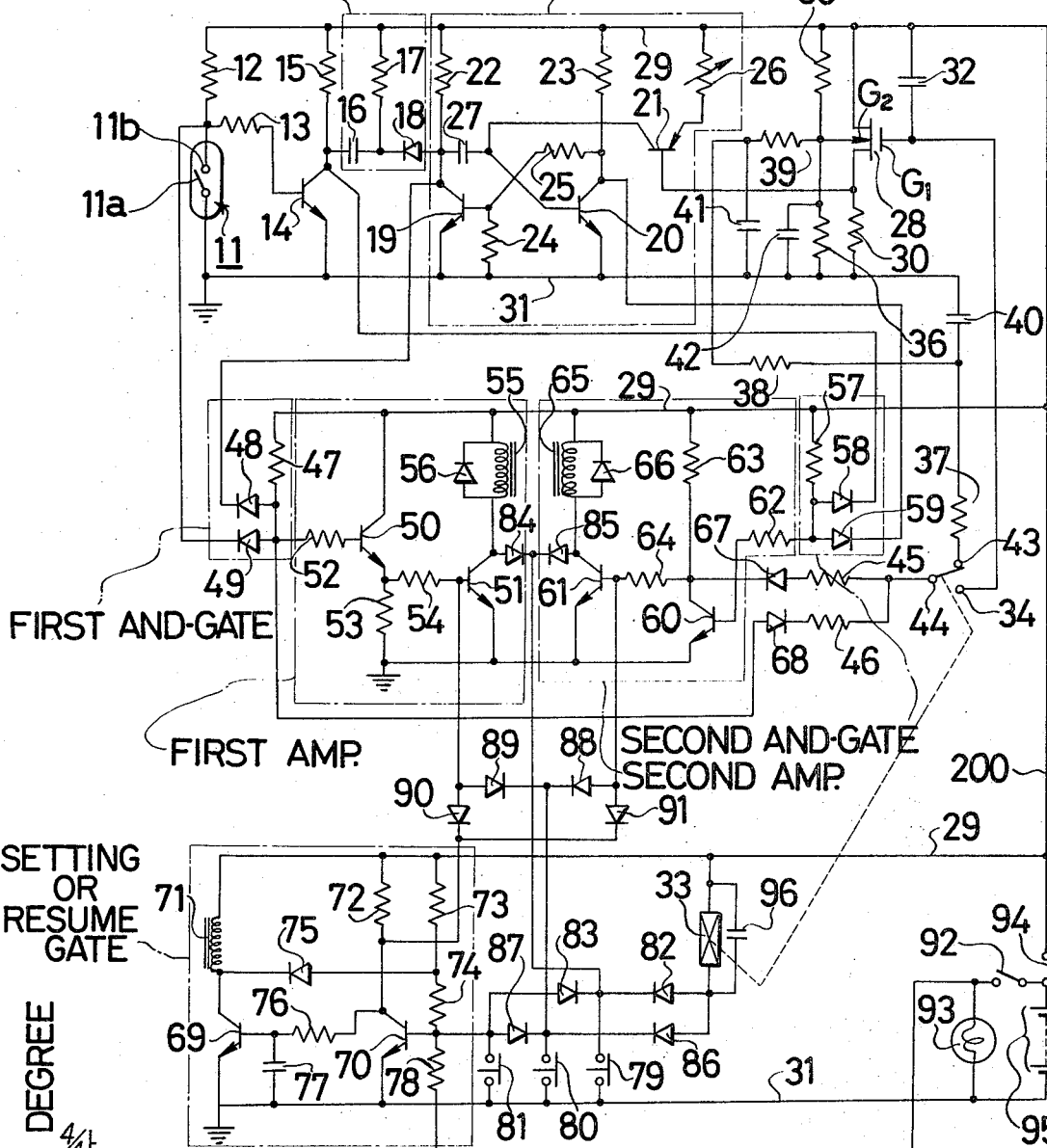
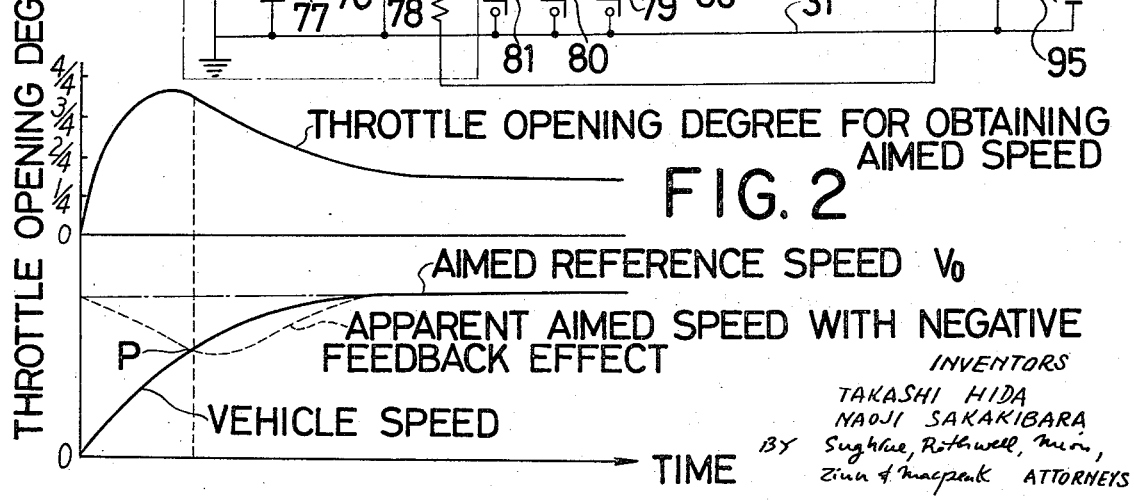

NEGATIVE FEEDBACK CIRCUIT FOR USE IN CONSTANT SPEED VEHICLE TRAVEL CONTROL DEVICE

BACKGROUND OF THE INVENTION

1. Field of the Invention:

This invention relates to a negative feedback circuit adapted for use in constant speed vehicle travel control device.

2. Description of the Prior Art:

Conventional constant speed vehicle travel control devices are generally so designed and arranged that occasional opening degrees of the conventional engine throttle valve on the vehicle, preferably automotive vehicle, are successively sensed by a potentiometer or the like means and the thus sensed successive vehicle speeds in terms of electrical volts are then negatively fedback. For this purpose, the potentiometer is generally provided between a servo mechanism and the valve throttle system for responding to occasional throttle valve opening; generally lengthy leads must be provided to extend from the potentiometer to a control circuit included in the vehicle travel control device.

With such arrangement, however, various drawbacks occur such as complexity in the design of the circuitry; difficulty in the mounting and adjustment of the circuitry; a shortened durable life of the potentiometer caused by highly variable humidity prevailing in the engine space of the vehicle, and fine foreign particles afloating in the air prevailing therein.

SUMMARY OF THE INVENTION

A main object of the present invention is to provide a negative feedback circuit of the above kind, capable of obviating substantially the aforementioned conventional drawbacks.

A specific object of the present invention is to provide a negative feedback circuit wherein the vehicle speed correction signal is fedback through a time lag element, thereby obviating the need for a potentiometer or the like element which is responsive to the throttle opening angle. This feedback system is used in advance of the mechanical servo and the like to effect speed control. Thus, by dispensing with the potentiometer or the like element, the design and construction of the circuit is simplified.

These and further objects, features and advantages of the invention will become more apparent when read the following detailed description of the invention by reference to the accompanying drawings.

BRIEF DESCRIPTION OF THE DRAWINGS

FIG. 1 is an electrical wiring diagram including a preferred embodiment of the invention.

FIG. 2 is an explanatory schematic chart for the demonstration of the working principle of the said embodiment.

DESCRIPTION OF THE PREFERRED EMBODIMENT

Referring now to FIGS. 1 and 2, the sole embodiment of the invention will be described hereinbelow in detail.

In FIG. 1, numeral 11 represents schematically a magnetically operated lead switch, adapted for being closed once, as an example, per every revolution of one of the wheels of an automotive vehicle, not shown. This lead switch 11 is called frequently "detector" throughout the specification and appended claims. With higher vehicle speed, represented by wheel speed as will be apparent from the foregoing, the on-off cycle as well as the on-period of the switch 11 becomes correspondingly shorter. The switch 11 comprises movable contact 11a and stationary contact 11b which is electrically connected through positive bus line 29 and lead 200 and main switch 94 to the positive side of current source 95; said main switch may be the conventional ignition switch for the engine, not shown, and is closed naturally when the engine is running. Resistors 12, 13 and 15 are connected as shown, relative to said switch 11 and a transistor 14 which is an emitter-grounded and inverter connection type in this specific embodiment. When the vehicle is running, a series of electrical impulses are thus applied as input signals to the base of transistor 14. Resistor 12 is bias resistor and resistor 15 is load resistor to the transistor which delivers thus a corresponding series of polarity-inverted impulses.

Numeral 16 represents a differentiating condenser which is connected together with resistor 17 and diode 18 to constitute a trigger circuit as shown by a chain-dotted line block, to a monostable multi-vibrator which includes transistors 19, 20 and 21, resistors 22, 23, 24 and 25, semi-fixed variable resistor 26 and condenser 27 connected with each other, as shown.

Numeral 28 represents a field-effect or MOS-FET type transistor, the drain side thereof being connected to said bus line 29 and the source side to ground line 31 through load resistor 30. The first gate $G_1$ is connected with condenser 32; and with a normally opened relay contact 34 of lead relay 33, respectively. The second gate $G_2$ is connected with a bias circuit constituted by resistor 35 and 36; and with a time lag circuit constituted by resistors 37, 38 and 39 and condensers 40, 41 and 42. The input or resistor 37 of the latter circuit is connected with a normally closed contact 43 of said lead relay 33. Common contact 44 of the latter is connected with resistors 45 and 46. The base electrode of transistor 21 is connected with the source side of said FET-transistor 28.

Resistor 47 and diodes 48; 49 constitute in combination a first AND-gate, the output therefrom being fed to a first amplifier comprising transistors 50; 51 and resistors 52; 53; 54 and amplified invertedly therein.

Numeral 55 represents the coil of a solenoid-operated and normally closed valve assembly, not shown. As will be later described more fully hereinafter, when this solenoid 55 is actuated to open the valve, vacuum is transmitted from the suction manifold of the vehicle engine, not shown, through a suction piping to a closeable port into a vacuum servo which is arranged to control the throttle valve through a flexible diaphragm mounted in the servo and a motion-transmitting cable (not shown) extending between the servo and the throttle valve, all these constituting constituents of the constant speed travelling device, although not specifically shown.

When the device is alternatively of the electromotor-driven type, said solenoid coil 55 corresponds to the accelerator coil, although not shown.

In the present embodiment, when the solenoid coil 55 is energized, the solenoid valve is brought to its open position, thereby vacuum being introduced through the now open port, not shown, into the interior space of the vacuum servo.

Numeral 56 represents a protecting diode which serves for absorbing surge voltages so as to protect the transistor 51.

Resistor 57 and diodes 58; 59 constitute in combination a second AND-gate, the output from the latter being fed to an amplifier constituted by transistors 60; 61 and resistors 62; 63; 64, for being amplified therein.

A solenoid-controlled valve assembly, represented only by a solenoid coil 65 thereof, is provided for cooperation with a further port, not shown, so as to keep the latter normally in its open position as shown, said port being provided at the servo and kept normally in communication with open atmosphere through a conventional air filter, not shown, attached to said servo. With the solenoid valve kept in its open position, atmospheric pressure will be led to the interior of the servo. When the constant speed travel device is alternatively of the electromotor-driven type, the solenoid corresponds to the decelerator winding of the motor.

In the present embodiment, when the solenoid coil 65 is energized as will be more fully described hereinafter, the solenoid valve is brought into its actuated position for closing its mating port, thereby the invasion of atmospheric air pressure from outside into the interior of the servo being positively prevented.

Numeral 66 represents a protecting diode which is designed and arranged for absorbing surge voltages, so as to protect the transistor 61.

The combination of diode 67 and resistor 45 acts to bring the potential at the first gate of FET-transistor 28 towards ground potential when transistor 60 becomes conductive or in other words, when the AND-gate comprising diodes 58; 59 and resistor 57 is in its off-state. Conversely, the combination of diode 68 and resistor 46 will act to bring the potential at the common contact 44 towards the source voltage when the output of the AND-gate comprising resistor 47 and diodes 48; 49 is off.

Transistors 69 and 70 constitute a setting or resume circuit, and numeral 71 represents solenoid coil of resume valve assembly, not shown, which cooperates with a further port, not shown, which is provided on the servo and is kept in fluid communication through said filter or cleaner to the open atmosphere. With this valve opened, atmospheric air is conveyed rapidly through said cleaner and the last mentioned port into the interior space of the servo.

When the constant speed travel device is of the electromotor-driven type, said solenoid coil 71 corresponds to a winding of the electromagnetic clutch provided between the motor gearing and the throttle, although not shown.

Numeral 72 represents a load resistor to said transistor 70 and numerals 73 and 74 represent base-bias resistors therefor. 75 represents a diode; 76 a base resistor of said transistor 69; 77 represents a condenser which acts upon said transistor 69 for retarding the operation thereof at a slight time lag. 78 represents a base resistor for said transistor 70. The aforementioned several parts are connected electrically as shown, so as to constitute a setting or resume circuit as demonstrated by a chain-dotted line block.

Numerals 79, 80 and 81 represent a series of three separate and independently manipulatable push button switches which can be conveniently fitted on a conventional driver's shift lever provided for speed control of the vehicle running speed, although not shown. Or alternatively, they can be fitted on the instrument panel near the driver's seat, although again not shown. Push button switch 79 serves for speed setting through speed accelerating stage; second push button switch 80 serves again for speed setting, yet through speed decelerating stage; third push button switch 81 serves for resuming service.

When the first button switch 79 is closed, current will flow from diodes 82, 83, 84 and 85 to ground line 31. By manipulating second button switch 80 to "on," current will flow from diodes 86, 87, 88 and 89 to ground line 31.

When resume switch 81 is closed, the base potential at the transistor 70 will become equal to that at ground line 31.

When switches 79, 80 and 81 are all on by error, solenoid coils 55 and 65 are both energized. Thus, a normally closed solenoid valve at the vacuum side which cooperates with coil 55 is opened, while a normally opened solenoid valve at the atmospheric side is closed. Therefore, the arrangement is at its speed-increasing stage for increase of the vehicle speed.

On the other hand, when switches 79, 80 and 81 are all turned off, the arrangement is one in which the vehicle travels at a constant speed corresponding to that which appears at the off-operation of these switches.

Through diodes 90 and 91, the base electrodes of transistors 51 and 61 are connected with the collector electrode of transistor 70. Numeral 92 is a stop switch which is operatively connected with the conventional automotive brake pedal, although not specifically shown. When the pedal is actuated, the stop switch is closed. A stop display lamp 93 is provided which is ignited upon closure of stop switch 92. Condenser 96 is provided across the lead relay 33 for retarding service to the latter. The connecting mode of the aforementioned several circuit elements is easily seen at a glace of the drawing.

The operation of the aforementioned device so far shown and described is as follows:

Since the main or ignition switch 94 is kept in its closed position during travel of the vehicle, a series of electrical impulses, the duration of each of these impulses being responsive to occasional vehicle travel speed, will be applied to the base electrode of transistor 14 through the repeatedly on-off controlled detector 11, as was suggested hereinbefore. More specifically, when the detector 11 is in its open condition, the source voltage from the source 95 is applied to the base of transistor 14, so as to bring the latter into its conductive state. At the same time, transistor 19 included in the monostable or one-shot multivibrator is concurrently brought into its conductive state, while the other transistor 20 is brought into its non-conducting state. The monostable period of the single-slot multivibrator is determined by the product of resistance value at 26, the emitter-collector resistance of transistor 21 and capacitance at 27.

Transistors 19 and 20 are arranged as shown mutually in opposite phases. If it is assumed that the width or duration period of each of the impulses when transistor 19 is in its non-conductive state be "$\bar{B}$:" that appearing at transistor 20 can be expressed by "B", representing a NOT. On the other hand, when the similar pulse width or duration period with the detector 11 kept open is assumed to be "A," that appearing at transistor 14 may be expressed in logical term by "$\bar{A}$."

Transistor 19 turns from its non-conductive to its conducting state when detector 11 is opened, and concurrently when the latter becomes the state of "A," transistor 19 will become the state of "B." At this time, transistor 14 is in its state of "$\bar{A}$," while transistor 20 is in its state of "B." Therefore, the output from the first AND-gate comprising diodes 48; 49 and resistor 47 is at this time "A.$\bar{B}$." Thus, if the pulse width "A" is larger than pulse width "B" (this means that the width "A" of the occasional vehicle speed pulse is larger than the reference pulse width "B," thus the vehicle is travelling at a slower speed than the reference or preset speed), the differential width which may be expressed by logically "A.(−) B" can be taken out in the form of the AND-output.

Reference pulse width "B" corresponds to the constant travel speed aimed at. This pulse width "B" which is the reference pulse width at the time of the initiation of a constant travel speed is made variable with control of transistor 21. This is accomplished by the action of FET 28 which varies the emitter-base voltage of transistor 21 to thereby alter its emitter-collector resistance. Thus, the metastable period of the single-shot multivibrator is variable and is adjusted to provide the apparent aimed-at or reference speed.

On the other hand, an output of "$\bar{A}$.B" may be taken out from the second AND-gate comprising diodes 58, 59 and resistor 57. The second AND-circuit has as its input the inverse of the first AND-circuit. More specifically, when a pulse input having a width of "A$\bar{B}$" is given to the first AND-circuit, then, the second AND-circuit will receive an input pulse with width of "$\bar{A}$·B". The second AND-circuit delivers an output signal pulse with pulse width of "B·A" when the vehicle speed signal pulse "A" is smaller than the width "B" of the reference pulse.

At this stage, when the vehicle driver manipulates the accelerating set switch 79 or the decelerating set switch 80, as the case may be, for attaining the desirous constant speed vehicle travel condition, the base potential at transistor 70 will drop and the transistor 70 turns "off," while, at the same time, the transistor 69 will become "on," thereby solenoid coil 71 being energized so as to close the related solenoid valve.

Therefore, the base potential at transistor 70 is grounded through diode 75 and transistor 69, and therefore, transistor 69 will be kept in its conducting state. At the same time, lead relay 33 is energized to separate its contact 44 from its normally closed contact 43 and to close contact 34, thereby the potential at the second gate $G_2$ of FET-transistor 28 changing to the reference bias value which is dividedly provided through divider 35; 36. When the vehicle speed pulse is longer in its width "A" than the pulse width "B" of the monostable transistor (which means that the occasional or practical vehicle speed is slower than the reference speed), the potential at the first gate $G_1$ of FET-transistor 28 will be raised through the action of diode 68 and resistor 46, and the last mentioned transistor 28 will act in the conducting direction, while the transistor 21 is caused to act in its non-conducting direction. The pulse width at the one shot multivibrator is determined by making the emitter-collector resistance of transistor 21 variable. More specifically, when transistor 21 is biased toward nonconduction by the voltage across the source load resistor 30, the collector-emitter resistance of transistor 21 will increase, and the pulse width "B" will become correspondingly longer or larger.

When conversely, the vehicle speed pulse width "A" is shorter than the pulse width "B" at the output of the monostable multivibrator, thus the practical vehicle speed being higher than the reference and the potential at first gate $G_1$ of FET-transistor 28 being lowered through the action of resistor 45, diode 67 and transistor 60. Therefore, the width of each of the generated pulses at the output of said monostable multivibrator will become shorter and shorter, until attainment of equalized pulse widths of these two kinds of pulses. In this way, a vehicle speed setting can be brought about to such effect that the pulse width "A" which corresponds to the practical vehicle speed is equal to the width "B" of the generated pulses at the multivibrator as the reference. This means that a reference vehicle speed has been set. Upon attainment of the above condition that the vehicle speed pulse width "A" becomes equal to the reference pulse width "B" and when the lead relay has returned to its initial state, the potential at the first gate $G_1$ of FET-transistor 28 is fixed by the action of condenser 32. Therefore, the pulse width "B" of the generated pulses at the multivibrator is also fixed. Therefore, the present vehicle speed is established and memorized as the pulse width "B."

During the vehicle travel under this constant speed control, and when under these conditions a deviation of the vehicle running speed from the established and memorized reference value, the relative relation between the both will be such as:

$$\text{"A"} > \text{"B"}$$

Therefore, transistors 50; 51 will become conductive and solenoid coil 55 is energized so as to introduce vacuum into the interior space of the vacuum servo. Motion will be therefore transmitted therefrom through a cable, not shown, to the throttle valve, in further opening direction of the latter for increasing the mechanical output from the vehicle engine and thus to increase the vehicle travelling speed towards the reference speed. With the thus invited increase of throttle opening degree, the potential at $G_2$ of FET-transistor 28 will be caused to increase correspondingly through diode 68, resistor 46, lead relay contacts 43; 44 and through the action of the retarding circuit comprising resistors 37, 38 and 39 and condensers 40, 41 and 42, so as to affect upon the transistor 29 in its conducting direction and upon transistor 21 in its non-conducting direction, so that the reference pulse width "B" is elongated to a slight degree. In this way, the practical pulse width "A" is brought into registration with the reference pulse width "B" at a slightly lower level of the once preset reference speed value.

When pulse width "A" becomes larger than "B," the apparent aimed-at speed is lower than the aimed reference speed, and control is made so as to bring pulse widths "A" and "B" into coincidence with each other, and in the range less than the aimed reference speed. In this way, otherwise possible "hunting" phenomenon caused by undue opening of the throttle, and the like cause, may be effectively prevented (please refer to Specification from line 9, page 12 to line 6, page 13.)

When pulse width "A" is smaller than "B," the apparent aimed-at speed is increased over the aimed reference speed, and control is made so as to bring the pulse widths "A" and "B" into coincidence to each other. Thus, otherwise possible "hunting" caused by undue closing degree at the throttle, and the like cause, may be effectively prevented (please refer to Specification, lines 7-24 on page 13.)

On the contrary, when the practical vehicle travel speed should exceed the set reference value, the relation between the both kinds of pulse widths will become:

$$"A" < "B"$$

Therefore, transistor 60 will become conductive and transistor 61 will become non-conducting.

Therefore, current flow through solenoid 65 is interrupted and atmospheric air pressure will be introduced from outside into the interior of the vacuum servo, as was referred to hereinbefore, so as to act upon the engine throttle valve towards its closed position for reducing the practical vehicle speed. At this time, the potential at $G_2$ of transistor FET-28 is reduced under the action of current flow through diode 67 and resistor 45 to transistor 60, said transistor 28 being acted upon thereby in its non-conducting direction and upon transistor 21 in its conducting direction so that the reference pulse width "B" is controlled to a slightly shorter value for the prevention of an over-due throttle opening.

When the brake pedal is depressed during this constant speed vehicle running conditions, stop switch 92 is closed, so as to ignite stop indicator lamp 93 and to convert the transistor 70 from its non-conducting to conducting state. In this way, the base potential at the transistor 51 as well as 61 is lowered, so as to close vacuum valve and to open atmospheric valve, not shown. Atmospheric air is therefore introduced into the interior of the vacuum servo. At the same time, transistor 69 becomes non-conducting and transistor 70 will become conducting so that the resume valve is rapidly opened for bringing the interior space of the servo rapidly into its filled position with atmospheric air. In this way, the throttle valve is subjected to throttling action towards the idling position for the vehicle engine.

Thereafter, resume button switch 81 is depressed for recovering the once set constant or reference vehicle speed before the brake actuation, transistor 70 becomes non-conductive and transistor 69 becomes conductive, thus the desired vehicle speed recovery being restored.

The main difference between the improved and conventional techniques may be still better understood by reference to FIG. 2.

In the conventional technique where the throttle opening degree is sensed through a potentiometer or the like means, the constant vehicle travel control device acts in the following way.

When, during a vehicle speed accelerating stage, the throttle opening degree is increased, the apparent reference speed will be reduced as shown by a dotted line in FIG. 2 and the throttle valve is opened wider until the intersection point "P" of the shown both curves is reached. Since the vehicle speed will, thereafter, exceed the apparent aimed speed, the throttle valve opening degree is reduced and the both speeds will be brought into coincidence to each other at a point in proximity to the aimed speed. In the conventional device wherein, as was referred to hereinbefore, throttle opening degree is sensed through a potentiometer on the like means and the sensed value is fedback, the potentiometer must be mounted at an intermediate point positioned between the servo device and throttle system so as to respond to throttle opening degree, and lead lines must be provided to extend to the control circuit for establishing necessary electrical connection therebetween, various drawbacks are encountered as was referred to hereinbefore.

In the arrangement according to this invention, however, these drawbacks can be substantially obviated with the necessary function preserved as before, as will become more apparent from the following discussion.

Before attainment of the vehicle speed brought into coincidence with an aimed reference speed $V_0$, acceleration signal will be conveyed to solenoid valve winding 55 for energization thereof, from the first AND-gate comprising diodes 48; 49 and resistor 47 and led to act upon FET-transistor 28 for elevating the potential at the second gate $G_2$ of the latter and through the said time delay circuit of the CR-type.

As shown in FIG. 2, even when the vehicle speed equals the apparent aimed speed (at point P), the vehicle speed will continue to increase since the apparent aimed speed is variable with time. Until attainment of the point "P," throttle valve is instructed to open and the signal is fed through the time lag circuit, so as to elevate the potential at $G_2$. Therefore, the aimed at speed becomes substantially lower than the reference speed V.

When the vehicle speed increases conversely beyond the point "P" in FIG. 2, which means that the practical vehicle speed exceeds the apparent aimed speed, the throttle valve opening degree will be reduced. Specifically, transistor 60 becomes conductive, so as to interrupt current flow through valve solenoid 65. More specifically, the current flow through the solenoid 65 for atmosphere-introducing valve is interrupted.

At this time, by the realization of conductive state of transistor 60, the potential appearing at second gate $G_2$ of FET-transistor 28 is lowered, so as to increase the apparent aimed speed, until the real vehicle speed attains at the aimed speeds where the apparent and originally established reference or aimed speeds are brought into coincidence with each other.

When either of setting switches 79 or 80 is closed manually only for a short time period, transistor 70 becomes non-conducting from conducting, while transistor 69 turns "on" from "off," so as to continue current feed to solenoid 71. By the provision of condenser 96, lead relay 33 will continue to act for a short duration, even after opening of these switches 79 and 80, so as to allow the establishment as well as memory of said vehicle speed as reference. Therefore, the vehicle will continue to travel at a constant speed as formerly established.

With continued closure of switch 79, current will be conveyed through diodes 84 and 85, to solenoid 55 of the normally closed solenoid valve, not shown, and to solenoid 65 of the normally opened solenoid valve, not shown. In this way, the vacuum servo, not shown, is brought rapidly into its vacuum condition, so as to open the throttle valve rapidly wider for performing a correspondingly quick acceleration of the vehicle. When the desired vehicle speed is attained in this way, switch 79 is opened, so as to establish and memorize the thus attained vehicle speed as the travel control reference.

On the other hand, with continued actuation of decelerating setting switch 80, the base potentials at the transistors 51 and 61 will be lowered through diodes 88 and 89 so that these transistors become non-conducting for bringing the interior space of the servo to atmospheric pressure. Then, the throttle valve is closed, so as to reduce the vehicle travel speed. When the brake pedal is depressed, stop switch 92 is closed and stop-demonstrating pilot lamp 93 is ignited, and at the same time, the base potential of transistor 70 is increased until the latter becomes conducting. Then, the base potentials at transistors 51 and 61 are decreased through diodes 90 and 91, thus these transistors being incapable to realize their conducting state. With atmospheric pressurization of the servo mechanism, transistor 69 turns from its conducting to non-conducting state, so as to interrupt current flow through solenoid 71 and to open the resume valve for rapidly bringing the servo mechanism into atmospherically pressurized condition. In this way, the constant speed vehicle speed control is released from its service position.

When it is desired to let the vehicle restore the formerly set travel speed which had been established in advance of the present brake application, it suffices to close temporarily the resume switch 81. By this operation, transistor 70 will become non-conducting, while transistor 69 turns from "off" to "on," thereby vacuum being introduced again into the servo, so as to recover the once established constant speed, and so on.

In the foregoing description, comparison between signals was made by relying upon the pulse width or duration time. But, when necessary, voltage level can be relied upon in place of the pulse width, for performing the necessary signal comparison jobs, upon making slight modifications to the shown and described circuit, although not specifically shown from its obviousness from the foregoing description of the invention, to these skilled in the art.

The embodiments of the invention in which an exclusive property or privilege is claimed are as follows:

1. A constant speed vehicle travel control device, comprising in combination:
   a. a vehicle speed establishing means;
   b. a first circuit means for sensing vehicle speed and adapted for delivery of an electric signal proportional to the sensed vehicle speed;
   c. a second circuit means for providing a reference signal proportional to vehicle speed at the time of actuation of said establishing means;
   d. a third circuit means for sensing a differential signal between said vehicle speed responsive signal and said reference signal and for feeding back said differential signal to said second circuit means for modifying said reference signal to a degree proportional to said differential signal so as to provide an apparent reference signal;
   e. a fourth circuit means for retarding the feed-back of said differential signal to said third circuit means; and
   f. a fifth circuit means responsive to said first and second circuit means for controlling said vehicle speed such that said vehicle speed responsive signal is brought into correspondence with said apparent reference signal when a difference exists between said vehicle speed responsive signal and said apparent reference signal.

2. The device of claim 1 wherein said second circuit means comprises a monostable means, coupled to said first circuit means, for producing a pulse output, the width of said pulse output being controlled by said third circuit means, and wherein said third circuit means includes an FET, storage means said storage means storing a signal for controlling said FET to enable said second circuit means to produce said reference signal, and AND gate means for sensing said differential signal.

3. The device of claim 1 wherein said third circuit means includes an FET having drain, source and first and second gate electrodes, storage means connected to said first gate electrode, the pulse width differential signal between the output signals from said first and second circuits is applied through said fourth circuit to said second gate electrode, the resistance of said FET being a function of the pulse width difference between said speed signal and said reference signal, said FET being coupled to said second circuit means for controlling said reference signal.

4. The device of claim 3 wherein said second circuit includes a transistor having its base coupled to said source electrode of said FET, the conductivity of said transistor being controlled by said FET wherein the emitter-collector resistance of said transistor adjusts the time constant and thereby the pulse width of said second circuit means to produce said apparent reference signal.

5. The device of claim 1 wherein said fifth circuit means comprises a first winding of a solenoid valve for increasing the opening degree of a throttle when the pulse width of the output signal from said first circuit means is larger than that of the output signal from said second circuit means, and a second winding of a solenoid operated atmospheric valve for decreasing the opening degree of said throttle, when the pulse width of the output signal from the first circuit means is smaller than that of the output signal from the second circuit means.

6. The device of claim 1 wherein said vehicle speed establishing means comprises an acceleration setting switch and a deceleration setting switch, said switches being operatively connected with a circuit for maintaining a solenoid valve of a vacuum servo in its closed position when either of said switches is actuated, a third switch means for disconnecting said fourth circuit means and actuating said fifth circuit means such that when said acceleration setting switch is actuated, the opening degree of said throttle is made larger, and, when said deceleration setting switch is actuated, said throttle opening degree is made smaller.

* * * * *